Oct. 12, 1948.   A. B. EDWARDS, JR   2,451,076
FRAME STRUCTURE
Filed April 2, 1946
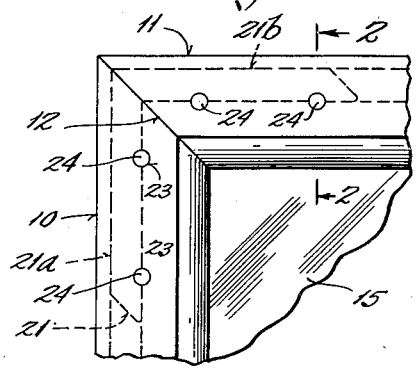
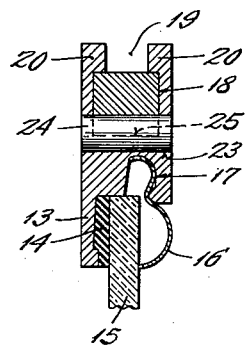
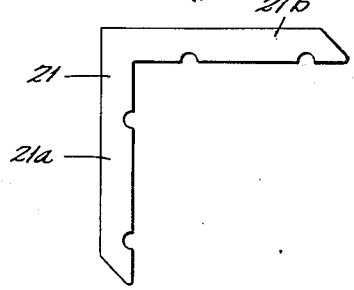
INVENTOR
Alfred B. Edwards, Jr.
BY Johnson, Klein and Hensel
ATTORNEYS Patented Oct. 12, 1948

2,451,076

UNITED STATES PATENT OFFICE 2,451,076

FRAME STRUCTURE

Alfred B. Edwards, Jr., Plandome, N. Y.

Application April 2, 1946, Serial No. 659,081

5 Claims. (Cl. 189—76)

This invention relates to an improvement in the construction of a sash or frame and is particularly well suited for a panel frame of the type employed in a combination window as described in my copending applications, Serial No. 659,079 and Serial No. 659,080.

It is an object of this invention to provide a corner construction for a frame of the lightest possible weight and at the same time to provide a frame having maximum strength and rigidity, so as to avoid deformation and possible resultant breakage. Furthermore, it is an object of this invention to provide a frame which can be readily assembled with utmost economy and a minimum amount of effort.

When panel frames are constructed of metal, the corner construction presents a considerable problem in maintaining the frame as light as possible, and at the same time providing strong, conveniently assembled means for holding the rails of the panel frame together in rigid relation. Ordinarily a corner member is fastened to the rails of the panel frame by bolts or similar fasteners passing through the corner piece and engaging the rails. The holes through which such bolts or fasteners pass are generally oversized or tend to become so in use, so that the corners of the frame are loose, and hence deformable rather than rigid. Moreover, the effective cross-sectional width of the corner piece is reduced by the full diameter of the hole, necessitating an oversize corner piece to provide adequate strength.

In accordance with my invention, the foregoing disadvantages are avoided, and the objects set out above are achieved in a panel, preferably having a metal frame, by constructing the frame of hollow members, preferably mitred at the ends, joined together by a corner member inserted in the hollow portions thereof, and held in assembly therewith by means of dowel pins extending through the frame from front to rear, with their center line coinciding substantially with one side, preferably the inner side, of the corner member.

When constructed in this manner, the shearing force on the dowel pins is distributed over the area of an axial plane of the dowel pin extending the full width of the corner member, in addition to two semi-circular transverse cross-section areas of the dowel pin, rather than over two transverse cross-sectional areas of the dowel pin as would be the case, if the dowel pin were located wholly within the corner member. Moreover the dowel pins force the corner members against the opposite side of the hollow portion of the frame members, so that a rigid assembly at the corners of the window is obtained. In addition, the width of the corner member is reduced only by half the diameter of the dowel pin, so that the holes for receiving the dowel pins reduce the strength of the corner member by only half as much as would be the case in a construction in which a bolt or pin is inserted through the body of the corner member. Hence, the size of the corner piece may be reduced or lightened without unduly weakening the frame.

The corner construction of a window panel frame in accordance with my invention will be more readily understood from the following description of a preferred embodiment of the invention, illustrated in the accompanying drawings, wherein:

Figure 1 is a front elevation of a corner of a window panel constructed in accordance with my invention.

Fig. 2 is a cross-section along the line 2—2 in Fig. 1.

Fig. 3 is a detail of a corner member included in the construction of Fig. 1.

As shown in the drawings, the panel frame members 10 and 11 are mitred so as to form a junction at the corner along a diagonal line 12. Each of these members comprises a flange 13 and sealing strip 14 for supporting a pane of glass 15 in the panel, and a resilient metal spline 16, inserted in a groove 17 along the inner edge surface of the panel member, extends outward therefrom and bears against the surface of the glass to hold it in place in the panel frame.

Each of said frame members includes, adjacent the outer edge thereof, a wide passage 18 of generally rectangular shape. To reduce the weight of the frame members, they may have in addition a narrower passage 19 communicating with passage 18, and opening along the outer edge of the panel members. The two passages thus provide a groove shaped liked a keyway running along the outer edge of the frame members, whereby the weight of the frame is reduced to a minimum. The widened edge portions 20 of the groove formed by passage 19 reinforce the frame members against flexure.

A corner member or insert 21 is provided having arms 21a and 21b forming a right angle, the cross-section of said member having substantially the same shape as the rectangular passages 18 in said frame members. The corner member 21 is assembled with the mitred ends of the frame members 10 and 11 by insertion of the arms 21a and 21b into the passages 18 of said members respectively and bringing the mitred ends of the frame members together so that they are in contact along the line 12.

One or more holes 23 adapted to receive fastening means are drilled as required through the frame members 10 and 11 and the corner member 21 assembled therewith, said holes having their center lines lying substantially in the plane of one of the surfaces of the corner member, preferably the inner surface thereof as shown in Fig. 1. The holes 23 when located in this way reduce the width of the corner member 21 by only half the diameter of the hole, as compared with the usual construction wherein a hole for receiving a bolt or dowel pin passes through the body of a corner piece, reducing its width by the full diameter of the hole. Accordingly, the corner piece can be of relatively lighter construction for a panel frame constructed in accordance with my invention, without sacrificing the strength thereof.

In order to complete the assembly of the corner structure, the fastening elements 24 which may be dowel pins, rivets, screws or the like are inserted in the holes 23 for holding the corner member 21 and the panel frame members together, said fastening means extending from the front to the rear surface of the panel members as shown in Fig. 2. In the form of the invention herein illustrated dowel pins are employed and force the corner member outwardly against the opposite side of passage 18, i. e. against the widened edges 20 of groove 19, holding the panel members 10 and 11 firmly in alignment with the arms of the corner member 21.

The shearing force applied to each dowel pin is distributed over the area of an axial plane thereof extending the full depth of the corner member 21, and over two semi-circular transverse cross-sectional areas of the dowel pin, the extent of said area being indicated by the dotted lines 25 in Fig. 2. The cross-sectional area of the dowel pin sustaining the shearing force applied thereto is of considerably greater extent than would be the case if the dowel pin passed through the center of the corner member 21, as in the usual construction, wherein the shearing force would be sustained only by the area of two transverse cross-sections of the dowel pin. The size of the dowel pin can thus be reduced to a minimum in the corner construction of my invention, resulting in the possibility of still further reducing the size of the corner piece without sacrificing the strength of the corner.

It will be seen that the corner of the frame can be readily and conveniently assembled merely by insertion of the corner member 21 into the passages 18 of the frame members 10 and 11, the corner member having preformed semi-cylindrical notches adapted to register with holes 23 in the frame members 10 and 11, the dowel pins 24 being inserted when said notches are brought into registration with the holes.

In the broader aspects of the invention, the frame connection may be employed in frames for other uses wherein rigidity, strength and lightness of the structure are desired and need not have the particular angular relationship herein illustrated.

Variations and modifications may be made within the scope of this invention and portions of the improvements may be used without others.

I claim:

1. In a frame, a pair of rail members each having a longitudinal passage therein; an insert for connecting abutting ends of said rails, said insert having arms inserted into and slidably engaging the walls of the passages in said rail members respectively; and means engaging an inner edge of the insert and forcing said insert outwardly for holding said insert assembled with said rail members, said means including a plurality of fastener elements extending transversely through said rail members laterally intersecting a surface of said corner member and having frictional engagement with said rail members and said corner piece.

2. In a frame for a window panel, a pair of mutually perpendicular rail members, each having a longitudinal passage of substantially rectangular cross-section therein; an L-shaped corner piece having arms of rectangular cross-section inserted into and slidably engaging the walls of the passages in said rail members respectviely; and means for urging said corner pieces outwardly into clamping relation with said rail members comprising a plurality of dowel pins extending transversely through the rail members and engaging an inner surface of the corner piece with their center lines lying substantially in a plane of the inner surface of said corner piece, the transverse thickness of said corner piece being substantially greater than the diameter of said dowel pins.

3. In a frame for a window panel, a pair of mutually perpendicular rail members each having a longitudinal passage therein, and their ends being cut diagonally to form a mitred joint at which the ends of the respective passages therein coincide, an L-shaped corner piece having arms of rectangular cross-section slidably engaging the walls of the passages and said rail members respectively; and means for clamping said corner pieces against the outer walls of said rail members comprising a plurality of cylindrical dowel pins extending transversely through the rail members and engaging an inner surface of the corner piece with their center lines lying substantially in a plane of the inner surface of said corner piece.

4. In a frame for a window panel, a pair of mutually perpendicular members each having therein a longitudinal passage of substantially rectangular cross-section, and a relatively narrower groove open at the edge of said rail members communicating with said rectangular passage; an L-shaped corner piece having arms of rectangular cross-section slidably engaging the walls of the said rectangular passage in said rail members respectively; and means for holding said corner pieces assembled with said rail members comprising a plurality of dowel pins each extending transversely through the rail members and engaging an inner surface of the corner piece with their center lines lying substantially in a plane of the inner surface of said corner piece, said dowel pins urging the corner piece against the wall of said rectangular passage at the base of said groove.

5. In a frame, a pair of mutually perpendicular rail members, each having a longitudinal passage of predetermined cross-section therein; an L-shaped corner piece having arms of a cross-section similar to the rail members inserted into and slidably engaging the walls of the passages in said rail members respectively; and means for clamping said corner piece against one of the walls of the passages in said rail members comprising a plurality of fastener elements extending transversely through the rail members and engaging an inner edge of the corner piece opposite said wall and forcing the corner piece laterally to clamp the piece against said wall.

ALFRED B. EDWARDS, Jr.

REFERENCES CITED

The following references are of record in the file of this patent:

UNITED STATES PATENTS

| Number | Name | Date |
| --- | --- | --- |
| 1,110,621 | Gabel | Sept. 15, 1914 |
| 1,817,162 | Mulligan | Aug. 4, 1931 |
| 2,342,537 | Geisler | Feb. 22, 1944 |

FOREIGN PATENTS

| Number | Country | Date |
| --- | --- | --- |
| 454,350 | Germany | 1924 |
| 472,784 | France | Aug. 18, 1914 |